Jan. 9, 1923.
C. SHIONO.
COMBINED LAMP AND BELL.
FILED SEPT. 20, 1921.
1,441,247
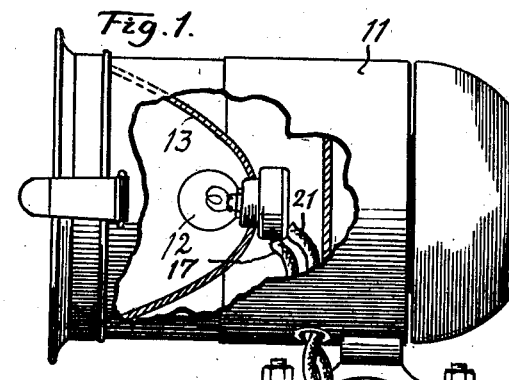
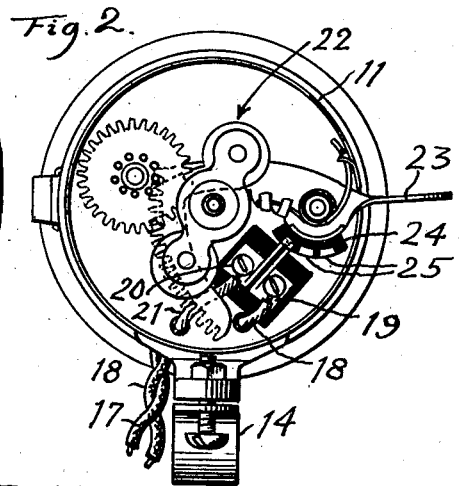
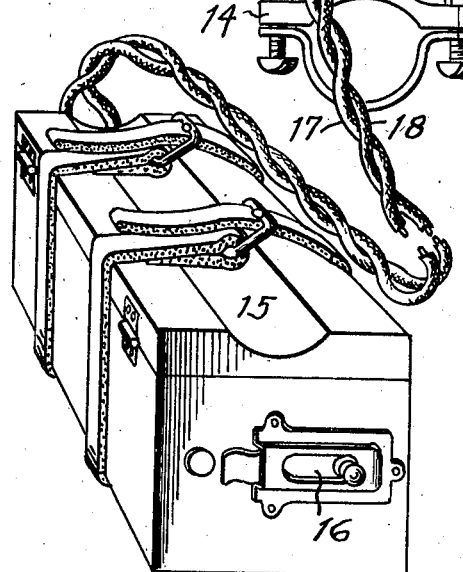
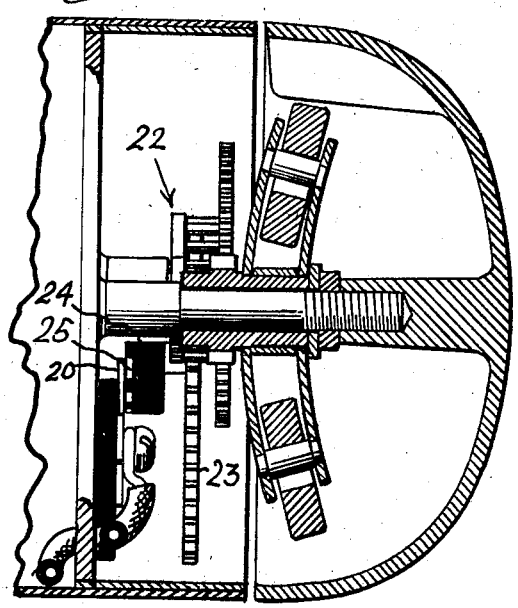
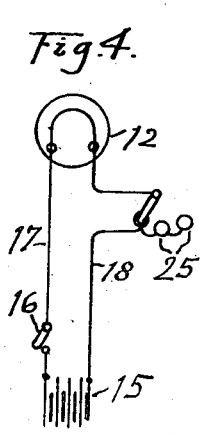
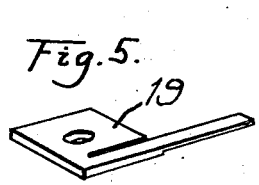
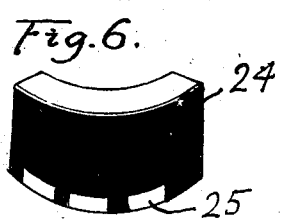
INVENTOR:
Chutaro Shiono
By Atty: Edward M. Kujuna Patented Jan. 9, 1923.

1,441,247

UNITED STATES PATENT OFFICE.

CHUTARO SHIONO, OF LOS ANGELES, CALIFORNIA.

COMBINED LAMP AND BELL.

Application filed September 20, 1921. Serial No. 502,012.

*To all whom it may concern:*

Be it known that I, CHUTARO SHIONO, a subject of the Emperor of Japan, residing in the city and county of Los Angeles and State of California, have invented a new and useful Combined Lamp and Bell, of which the following is a specification.

This invention relates to combined lamp and bell adapted for use on bicycles and motorcycles and other vehicles of like character, and its objects are to provide a combination of visual and audible signaling means, and to eliminate an extra attachment on the bicycle, motorcycle or vehicle.

In the drawings forming a part of this specification, Figure 1 is a side view of a lamp and bell embodying my invention. Fig. 2 is an end view of the same, showing the bell gong detached. Fig. 3 is a fragmentary and enlarged sectional view. Fig. 4 is a diagram showing the arrangement of the wiring for the electric elements. Fig. 5 is a perspective detail view of a fixed contact element. Fig. 6 is a perspective detail view of a switch element.

Referring to the drawings, my device consists of a lamp body 11, having therein the electric bulb 12 and reflector 13, and provided with a clamp 14, for attachment to a bicycle or motorcycle. A battery 15 is adapted for attachment to the frame of the bicycle or motorcycle, and is provided with a switch 16. Electric circuit conduits 17 and 18, extend to the lamp body 11; the conduit 17 being connected to lamp bulb 12, and the conduit 18 being connected to a switch contact member 19. From the adjacent switch contact member 20, a conduit 21 extends to the bulb 12. The bell actuating mechanism 22, mounted within the lamp body 11, includes a lever 23 for manual manipulation thereof. As there are many bicycle bells embodying this mechanism, on the market and now in use, the same is not described in detail. Lever 24 is provided with an insulating switch member 24, provided with a series of contact elements 25, adapted to engage with switch contact members 19 and 20.

In use, the battery switch 16, during the day is left in open position as shown in Fig. 1. When switch 16 is in closed position, a circuit is formed, embracing the conduit 17, bulb 12, conduit 21, contact members 19 and 20 and one of the bridging switch elements 25, conduit 18, switch 16 and battery 15. When lever 23 is actuated for ringing the bell, the circuit is momentarily interrupted as the bridging contact members 25 consecutively pass over the contact members 19 and 20, causing a series of flashes to be emitted by the lamp.

It may be noted that my combination of the lamp and bell eliminates one attachment for the bicycle or motorcycle. The circuit interrupting switch, being located adjacent to the pivotal point of the bell-actuating lever, does not interfere with the ease of operation of the same.

Other advantages are that this device may be made cheaper or at less expense than when the bell and lamp are constructed separately, and that as a signal device, the same is more efficient; the flashes emitted by the lamp serving to further attract attention to the audible signal.

What is claimed is:

The combination with visual signaling means embodying a lamp body, a lamp bulb within the lamp body, an electric energizing circuit for the lamp bulb, and fixed contact elements in the electric energizing circuit, of a bell mounted on the lamp body, an actuating mechanism therefor including an operating lever, and a series of bridging contact elements carried by the operating lever and engaging with the fixed contact elements, one of said bridging contact elements being normally in engagement with the fixed contact elements, and the remaining bridging contact elements consecutively engaging with the fixed contact elements to intermittently interrupt the energizing circuit during the movement of said operating lever.

In testimony whereof, I hereunto affix my signature.

CHUTARO SHIONO.